Figure 1:
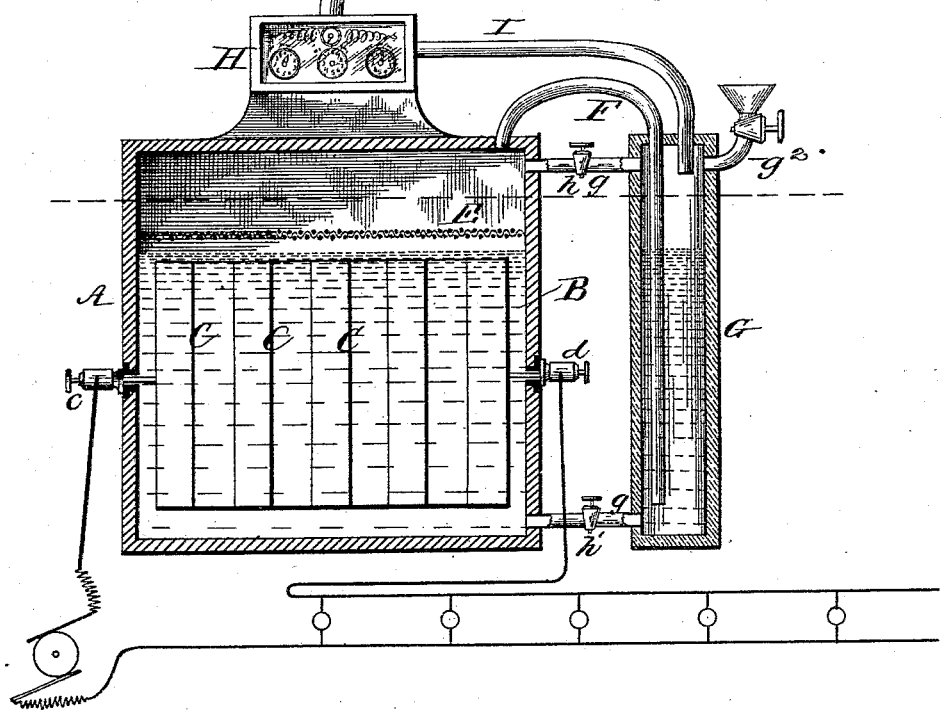

(No Model.)

W. F. SMITH.
ELECTRIC METER.

No. 401,226. Patented Apr. 9, 1889.

UNITED STATES PATENT OFFICE.

WALTER F. SMITH, OF PHILADELPHIA, PENNSYLVANIA, ASSIGNOR TO THE UNITED ELECTRIC IMPROVEMENT COMPANY, OF GLOUCESTER CITY, NEW JERSEY.

ELECTRIC METER.

SPECIFICATION forming part of Letters Patent No. 401,226, dated April 9, 1889.

Application filed August 22, 1888. Serial No. 283,431. (No model.)

*To all whom it may concern:*

Be it known that I, WALTER F. SMITH, a citizen of the United States, residing at Philadelphia, in the county of Philadelphia and State of Pennsylvania, have invented certain new and useful Improvements in Electric Meters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to electric meters, and relates in particular to that class of meters wherein the evolution of gas generated by the passage of an electric current through a fluid-conductor is employed to measure the quantity of current which has passed in a given time.

My invention has for its object the provision of a meter wherein the quantity of any electric current passing through a conductor will be accurately and definitely measured and recorded or indicated upon a dial or dials.

In a meter dependent for operation upon the evolution of gas or gases by electrolysis or the passage of an electric current through a solution or a liquid the following features are requisite for the attainment of the best results: First, the electrodes used should be insoluble in the liquid or solution in which they are immersed; second, they should be capable of resisting the action of the gases evolved at their surfaces; third, the solution should be of high conductivity; fourth, the gases evolved should be harmless and inodorous; fifth, the counter electro-motive force should be as low as possible.

My invention consists in the novel construction, combination, and arrangement of parts wherein, by means of a meter provided with the usual appurtenances for indicating upon a dial or dials the amount of gas passing through the meter and a closed vessel containing a liquid or solution, and an anode and cathode, I am enabled to determine by consulting such dial or dials the amount of electric current which has passed through a conductor within a given time in which said anode and cathode are interposed.

In carrying my invention into effect I prefer to employ iron electrodes, either plain or coated with nickel, and arranged somewhat in the manner of the positive and negative plates in a secondary battery—that is, each electrode consisting of a number of sections connected together and nesting with a number of similar sections forming the opposite electrode. The electrodes so arranged are immersed in a solution of caustic potash of the proper specific gravity and the whole incased in a suitable receptacle. A short distance above the surface of the liquid in the receptacle referred to I arrange a horizontal partition of iron wire-gauze for the purpose of preventing the overflow of bubbles or froth through the provided avenue of access to the registering apparatus, and as an additional safeguard against the overflow of froth, bubbles, or anything other than the gases the latter are passed through an auxiliary receptacle or condensing-chamber before being passed through the registering apparatus.

Figure 2:
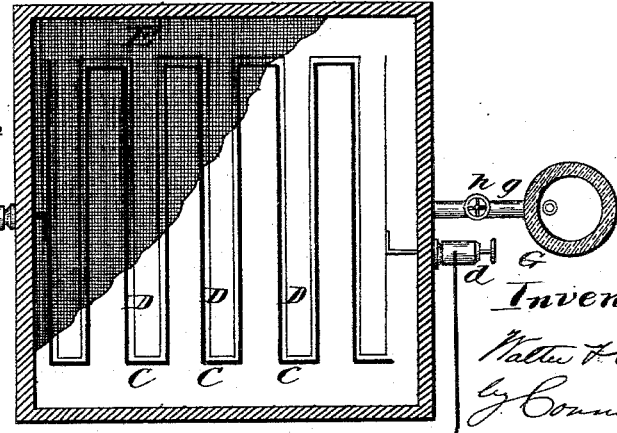

Referring to the accompanying drawings, Figure 1 is a vertical sectional view of my improved electric meter, and Fig. 2 a horizontal sectional view of the same.

A designates a closed vessel of any convenient or required size, and composed of a material impervious to the action of the liquid or solution, B, contained therein.

C C C designate metallic plates, preferably iron nickel-plated, arranged in the solution B and electrically connected with a screw-cup, $c$, upon the outside of the vessel.

D D D designate another set of plates similar to the plates C C C, and alternating in position with and insulated from the same. The plates D D D are electrically connected with a screw-cup, $d$, upon the outside of the vessel.

E designates a partition or screen of iron wire-gauze, which is arranged in the vessel A a short distance above the level of the fluid B.

F designates an outlet-pipe leading from above the surface of the liquid in vessel A to or near to the bottom of a vessel, G, which may be either a subdivision of vessel A or a separate vessel, being in either case, however, in communication at top and bottom with vessel A through pipes $g$ $g'$, having cocks $h$ $h'$. This vessel G serves as a condenser to receive and retain any froth or free moisture which may pass over from vessel A, and serves also as a means whereby the solution in vessel A may be replenished from time to time. This receptacle G being provided with an inlet-pipe, $g^2$, having a plug or cock, water may be introduced thereto as required and communication established with vessel A by opening the cocks $h$ $h'$. This receptacle G may be made of glass and serve as a gage to indicate the height of the solution in vessel A.

H designates a gas measuring and indicating instrument, which may be conveniently located upon top of the vessel A, and is provided with the internal mechanism and the indicating dials and hands commonly employed in instruments of this class.

The particular construction of the indicating-instrument forms no part of my invention, and it will suffice to say that any known or desired instrument may be employed which will accurately measure and record or indicate the amount of gas passing through it.

The instrument H is in communication with the interior of the vessel G, a pipe, I, connecting the two, and a pipe, K, having a free outlet, conveys the gas which has passed through the instrument H to any convenient point of escape. The terminals of the electrical conductor through which the current passes having been connected to the screw-cups $c$ $d$, an evolution of gas is set up by the decomposition of the fluid. The amount of gas developed is proportionate to the amount of current passing through the conductors. The gas so evolved passes through the screen E and over into the vessel G through the pipe F, and rising through the fluid in this vessel goes to the measuring-instrument A, which is thereby set in action and caused to register and indicate according to any accepted standard the amount of gas passing through it, and accordingly the amount of current which passes through the vessel A. Let it now be supposed that the meter is in series with a circuit of incandescent lamps arranged in multiple arc. The current passing through the vessel A and relatively the amount of gas developed is proportionate to the number of lamps glowing. If one or more lamps be cut out, the current passing through the circuit is decreased, and the meter indicates this fact by a slower measurement. If the number of lamps be increased, a corresponding increase in the current follows, and the indicator registers the increase.

The apparatus as described is simple in construction and comparatively inexpensive, and needs but little attention, it being sufficient to add a little water from time to time as the water in the vessel A is decreased in volume by the evolution of gases.

Having described my invention, I claim—

1. In an electric meter, the combination, with a vessel adapted to contain a fluid-conductor, electrodes contained in said vessel, and a gas-measuring instrument in communication therewith, of an auxiliary receptacle interposed between said vessel and measuring-instrument and communicating with said vessel above and below the fluid-level thereof, substantially as and for the purpose described.

2. In an electric meter, the combination of a closed vessel containing electrodes and adapted to contain a fluid-conductor, a foraminated partition arranged in said vessel above the fluid-level, and a gas-measuring instrument in communication with said vessel by a pipe opening into the vessel above said partition, substantially as described.

3. In an electric meter, the combination, with a vessel containing electrodes composed of sections of iron nickel-coated and a solution of caustic potash, of a gas-measuring instrument in communication with said vessel, substantially as described.

4. In an electric meter, the combination, with a vessel adapted to contain a fluid-conductor, of electrodes contained in said vessel and composed of sections of iron coated with nickel and a gas-measuring instrument in communication with said vessel, substantially as described.

5. In an electric meter, the combination, with a vessel containing electrodes composed of sections of iron and a solution of caustic potash, of a gas-measuring instrument in communication with said vessel, substantially as described.

In testimony whereof I affix my signature in presence of two witnesses.

WALTER F. SMITH.

Witnesses:
 JOS. B. CONNOLLY,
 GEORGE W. CLEMENT.